Dec. 8, 1964   L. J. RODGERS   3,159,974
MASTER CYLINDER
Filed March 25, 1963
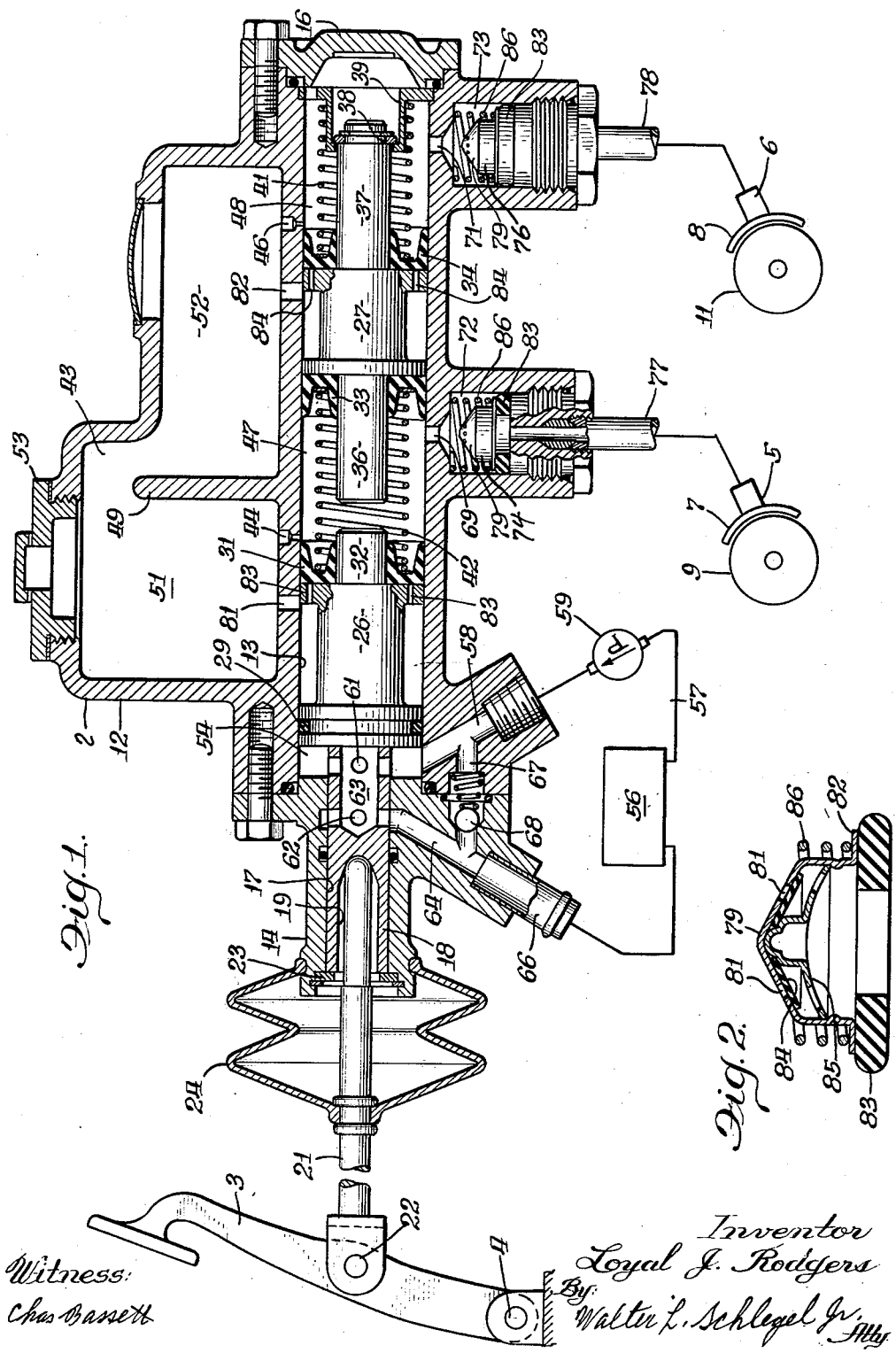
Witness:
Chas Bassett
Inventor
Loyal J. Rodgers
By Walter L. Schlegel Jr. Atty

3,159,974
MASTER CYLINDER
Loyal J. Rodgers, Chicago, Ill., assignor to Amsted Industries Incorporated, Chicago, Ill., a corporation of New Jersey
Filed Mar. 25, 1963, Ser. No. 267,708
2 Claims. (Cl. 60—54.6)

This invention relates to hydraulic brake systems adapted for use on highway vehicles such as trucks and busses and is more particularly concerned with the provision of a master cylinder device adapted to be manually operated to control the flow of hydraulic fluid to the front and rear wheel brake cylinders to decelerate a vehicle.

An object of the invention resides in the provision of a master cylinder device embodying primary and secondary pistons slidably mounted within a common cylinder and operative responsive to manual actuation of a control valve to supply fluid under pressure to their respective front and rear wheel brake cylinders.

Another object of the invention resides in the provision of a master cylinder device in which the primary and secondary pistons act approximately simultaneously to supply pressurized fluid to their respective wheel brake cylinders.

A further object of the invention resides in the provision of a master cylinder device adapted to be manually actuated to operate the front and rear wheel brakes in the event of failure of the hydraulic pump employed to supply pressurized fluid to the master cylinder.

The invention embodies other novel features, details of construction and arrangement of parts which are hereinafter set forth in the specification and claims and illustrated in the accompanying drawings, forming part thereof, wherein:

FIGURE 1 is a section, partly in side elevation, illustrating a hydraulic brake system provided with a master cylinder device embodying features of the invention.

FIGURE 2 is an enlarged fragmentary section illustrating the construction of a conventional master cylinder check valve and valve seat employed in the hydraulic brake system.

Referring now to the drawings for a better understanding of the invention, the hydraulic brake system is shown as comprising a master cylinder device 2 adapted to be secured in fixed position upon a vehicle and manually operated by a conventional brake pedal 3 pivotally mounted at 4 on the vehicle to supply pressurized fluid to front and rear wheel brake cylinders 5 and 6 to frictionally engage the brake shoes 7 and 8 against their respective brake drums 9 and 11 to decelerate the vehicle.

The master cylinder device is shown as comprising a housing 12 having a longitudinally extending horizontal cylinder 13, one end of the cylinder being closed by a valve casing 14 and the other end being closed by a cap 16. The valve casing 14 is provided with a valve bore 17, coaxial with the cylinder 13, to slidably receive a sleeve control valve 18 formed with a recess 19 to receive one end of a push rod 21 pivotally connected at 22 to the brake pedal 3. An abutment ring 23 is provided on the valve casing 14 at the outer end of the valve bore 17 to engage and limit outward movement of the valve 18. The valve bore 17 is maintained free of dirt by means of a resilient rubber boot 24.

Primary and secondary pistons 26 and 27 are slidably mounted within the cylinder 13. One end of the primary piston 26 is formed with an annular recess to receive an O-ring 29, and the other end of the piston is provided with a resilient sealing ring 31 encircling a stem 32. Resilient sealing rings 33 and 34, provided on opposite ends of the secondary piston 27, snugly encircle coaxial stems 36 and 37 projecting from opposite ends of the piston.

A washer 38 is secured to the end of the stem 37 for abutting engagement against the end of a stop sleeve 39 secured in fixed position on the end of the housing 12 by the cap 16. A helical compression spring 41 having a load rate of 16½ lbs. per inch is interposed between the sleeve 39 and the secondary piston 27, and a helical compression spring 42 having a load rate of 13 lbs. per inch is interposed between the pistons 26 and 27.

A brake fluid reservoir 43 is formed in the housing 12 above the cylinder 13 to supply fluid through inlet ports 44 and 46 into primary and secondary chambers 47 and 48, respectively, defined within the cylinder by the pistons 26 and 27, the reservoir being provided with a baffle 49 to form two separate compartments 51 and 52 therein. The reservoir is provided with a threaded opening to receive a filler cap 53.

A control valve chamber 54 is defined at one end of the cylinder 13 between the valve casing 14 and the primary piston 26. Fluid contained in a tank 56 is adapted to be transferred through an inlet conduit 57 and inlet passage 58 into the control valve chamber 54 by means of a conventional hydraulic engine driven pump 59 capable of supplying fluid under a pressure of from 800 to 1500 lbs. per sq. inch.

The sleeve valve 18 is formed with inlet and outlet ports 61 and 62 respectively, leading outwardly from an axial passage 63, the inlet ports 61 being in registry with the chamber 54, and the outlet ports 62 being normally in registry with a fluid outlet passage 64 connected to the tank 56 by a return conduit 66. A by-pass 67 extends from the inlet passage 58 to the outlet passage 64 and is provided with a spring biased check valve 68.

Outlet ports 69 and 71 lead from the chambers 47 and 48, respectively, to check valve chambers 72 and 73 respectively, provided with identical conventional master cylinder check valves 74 and 76, respectively. Conduits 77 and 78 lead from the chambers 72 and 73, respectively, to their respective front and rear wheel brake cylinders 5 and 6.

As illustrated in FIGURE 2, each check valve 74–76 comprises a cup-shaped outer body 79 having a plurality of apertures 81 arranged in a circle, the body having an annular flange 82 for engagement against a resilient valve seat ring 83 provided with its valve chamber (72–73). To close the apertures 81, a resilient rubber disk 84 is normally held against the inner surface of the body 79 by means of perforated inner wall 85. A helical compression spring 86 is provided to yieldably resist movement of the body 79 away from its seating 83, the spring being designed to maintain the fluid in its respective conduit (77–78) under a nominal pressure of, for example, 6 or 8 lbs. per square inch when the brake is released.

In the operation of the hydraulic brake system thus shown and described, the engine driven pump 59 operates continuously to circulate fluid from the tank 56 into the valve chamber 54 and thence through the sleeve valve ports 61 and 62 and conduit 66 back to the tank when the brake pedal 3 is in its released position. To decelerate the vehicle, the operator actuates the brake pedal 3 to move the sleeve valve 18 and primary piston 26 inwardly to thereby gradually dispose the outlet ports 62 out of registry with outlet passage 64 to increase the fluid pressure within the control valve chamber 54.

As the fluid pressure increases within the chamber 54, the primary piston 26 is moved past the fluid inlet port 44 and causes the fluid pressure to increase within the primary chamber 47 to thereby move the secondary piston 27 past the inlet port 46 to increase the fluid pressure in the secondary chamber 48. As the fluid pressure increases within the chambers 47 and 48, fluid is directed from the chambers past the check valves 74 and 76 into the conduits 77 and 78 to brake cylinders 5 and 6 which then act to engage the brake shoes 7 and 8 against their respective brake drums 9 and 11. When the operator releases the brake pedal 3, the springs 41 and 42 will return the pistons 26 and 27 to their initial positions.

In the event of failure in the rear wheel hydraulic system, the stem 37 on the secondary piston 27 would engage the cap 16, and the front wheel system would be operated by pressurized fluid in the primary chamber 47.

In the event of failure in the front wheel hydraulic system, the primary piston stem 32 would abut the secondary piston stem 36 to increase the fluid pressure in the secondary chamber 48 for operating the rear wheel hydraulic system.

In the event of failure of the pump 59, manual operation is provided by engagement of the valve 18 against the primary piston. Under this condition, the chamber 54 would be supplied by gravity with fluid passing from the tank 56, through the by-pass 67 and inlet 58 to the chamber.

In the event of leakage in the front or rear hydraulic systems, additional fluid will be drawn from the reservoir chambers 51 or 52 through openings 81 or 82 and apertures 83 or 84, and past the cups 31 or 34 into their respective chambers 47 and 48.

I claim:

1. In a hydraulic brake system for a vehicle, a housing having a cylindrical bore, primary and secondary pistons in said bore to define primary and secondary fluid chambers and a valve chamber, front and rear wheel brakes operable responsive to fluid pressure in said primary and secondary fluid chambers respectively, compression springs in said fluid chambers to yieldably resist movement of said pistons responsive to an increase of fluid pressure in said valve chamber, a sleeve valve slidably mounted in one end of the housing and having its inner end extending through the valve chamber into abutting engagement against said primary piston, said valve having an axial passage and an inlet port leading from the valve chamber to said axial passage, said valve having an outlet port leading from said axial passage to an outlet passage in the housing when said valve is in its retracted brake release position, said housing having a fluid inlet passage leading to said valve chamber, means for supplying fluid under pressure through said fluid inlet passage into said valve chamber, and means to move said sleeve valve and primary piston inwardly to gradually move the outlet port out of registry with said outlet passage to thereby increase the fluid pressure within the valve chamber.

2. A brake system according to claim 1 in which the housing is provided with a by-pass leading from the outlet passage to said fluid inlet passage, and a check valve within said by-pass.

References Cited in the file of this patent

UNITED STATES PATENTS

| | | |
|---|---|---|
| 2,157,733 | Sessions | May 9, 1939 |
| 2,174,615 | Bowen et al. | Oct. 3, 1939 |
| 2,194,816 | Van Vestraut et al. | Mar. 26, 1940 |
| 2,239,751 | Kritzer | Apr. 29, 1941 |
| 2,831,324 | Baldwin | Apr. 22, 1958 |
| 2,992,533 | Hodkinson | July 18, 1961 |
| 3,060,691 | Davis | Oct. 30, 1962 |
| 3,064,432 | Shutt | Nov. 20, 1962 |